United States Patent [19]

Takase et al.

[11] Patent Number: 5,461,626
[45] Date of Patent: Oct. 24, 1995

[54] METHOD AND APPARATUS FOR MULTIPLEXING DIGITAL SIGNAL

[75] Inventors: Akihiko Takase, Tokyo; Shirou Tanabe, Hachioji, both of Japan

[73] Assignee: Hitachi, Ltd., Tokyo, Japan

[21] Appl. No.: 82,015

[22] Filed: Jun. 25, 1993

Related U.S. Application Data

[63] Continuation of Ser. No. 497,626, Mar. 23, 1990, abandoned.

[30] Foreign Application Priority Data

Mar. 27, 1989 [JP] Japan ..................... 1-071714

[51] Int. Cl.⁶ ..................................... H04J 3/24
[52] U.S. Cl. ........................................... 370/94.1
[58] Field of Search ................. 370/94.1, 60, 58.1, 370/112, 85.6, 84; 340/825.5, 825.51

[56] References Cited

U.S. PATENT DOCUMENTS

| | | | |
|---|---|---|---|
| 4,071,701 | 1/1978 | Leijonhufvud et al. | 370/84 |
| 4,731,785 | 3/1988 | Ferenc et al. | 370/94.1 |
| 4,744,082 | 5/1988 | Fujimura et al. | 370/112 |
| 4,759,018 | 7/1988 | Buchner | 370/112 |
| 4,779,089 | 10/1988 | Theus | 370/85.6 |
| 4,819,228 | 4/1989 | Baran et al. | 370/94.1 |
| 4,852,084 | 7/1989 | Verbiest et al. | 370/94.1 |
| 4,905,231 | 2/1990 | Leung et al. | 370/94.1 |
| 4,933,934 | 6/1990 | Aikoh et al. | 370/112 |

OTHER PUBLICATIONS

"Architecture and Technology Considerations for Multimedia Broadband Communications", Proceeding of Global Telecommunications Conference, November, Marek R. Wernik.

Primary Examiner—Douglas W. Olms
Assistant Examiner—Dang Ton
Attorney, Agent, or Firm—Antonelli, Terry, Stout & Kraus

[57] ABSTRACT

A digital signal multiplexing method and apparatus include statistically multiplexing packet signals which are transferred through first circuits having a first speed to a second circuit having a second speed, the second speed being higher than the first speed. The method includes the steps of dividing the signal transmitted to the second circuit into a plurality of circuit management units, distributing the packet signals to the plurality of circuit management units and transmitting on a packet unit basis, dividing the multiplexing packet signals which were statistically multiplexed to the second circuit into receiving circuit management units corresponding to the plurality of circuit management units, and generating the received packet signals included in the receiving circuit management units corresponding to the first circuits.

27 Claims, 11 Drawing Sheets

METHOD AND APPARATUS FOR MULTIPLEXING DIGITAL SIGNAL

This application is a continuation of application Ser. No. 497,626, filed on Mar. 23, 1990 now abandoned.

BACKGROUND OF THE INVENTION

The present invention relates to a statistical multiplexing method and apparatus in a packet communication system and, more particularly, to a method and apparatus of efficiently multiplexing a high speed packet signal to a transmission line of a large capacity.

In the packet switching system, a packet multiplexer for statistically multiplexing signals from a plurality of terminals is used. The packet multiplexer is provided between the terminal equipment and the packet switching system and temporarily stores packet signals into a memory from a plurality of terminal equipment and sequentially transmits the packet signals to the switching system.

An example of such a statistical multiplexer has been disclosed in the literature by Marek R. Wernik, "Architecture and Technology Considerations for Multimedia Broadband Communications", Proceedings of Global Telecommunications Conference, November, 1988, pp. 663–667.

Two kinds of effects are obtained in the signal multiplex. The first effect is the improvement of the efficiency of the transmission line. The signals transmitted from the terminal equipment do not always exist at a time when there is no signal to be transmitted from the multiplexer. At such a time, the other terminal equipment may use the transmission line, so that the utilization of the multiplexing transmission line can be increased. Second, the transmission cost per terminal equipment can be reduced by sharing the transmission line with other terminal equipment. The line costs can be reduced by transmitting the signals from a plurality of terminal equipment in a lump rather than by directly transmitting the signals from terminal equipment to the switching system.

A packet multiplexer is used to obtain the first effect. A circuit multiplexer is used to obtain the second effect. The circuit multiplexer is different from the packet multiplexer, in that the timing positions in the secondary circuit (multiplexing circuit) of all of the primary circuits are deterministically assigned in the circuit multiplexer. Hitherto, the circuit multiplexer is generally used for multiplexing to the transmission line which has a large capacity. Such a method is based on a feature in which as the circuit multiplex executes the deterministic operation, the high speed operation can be performed as compared with the packet multiplex.

The statistical multiplexing is executed by multiplexing to the primary circuits. Such a multiplexing method is effective where the multiplexed circuit speed is sufficiently higher than the packet signal speed. The packet signals from the terminal equipment are statistically multiplexed to the primary circuits of the circuit multiplexer by the packet multiplexer. The circuit multiplexer deterministically multiplexes the primary circuits to the secondary circuit of a large capacity.

In a conventional packet multiplexer, it is presumed that the speed of the packet signals is sufficiently lower than the speed of the packet multiplexing signal. For instance, the packet signal speed could be set to 64 kb/sec while the packet multiplexing signal speed is set to 1.5 Mb/sec, and the ratio between those speeds is ten times or more.

It has been disclosed in the above-mentioned reference literature that even in the case where high speed signals such as video information or file information of a large capacity are assembled for packets and are multiplexed, in order to obtain the similar statistic effects, it is necessary that the multiplexing circuit speed is set to be higher than the high speed packet signal speed by ten times or more.

However, if the packet signal speed is set to be 1/10 or more of the primary circuit speed, as mentioned above, no statistic effect is derived and such a case is equivalent to that the circuits of the speed similar to the packet signal speed are deterministically assigned. Further, if the packet signals of a speed which is set to be ½ or more of the primary circuit speed are input from the terminal equipment which are packet multiplexed to the same primary circuit, the other packet signals cannot be transmitted in spite of the fact that almost of the secondary circuit is usable.

In the case where the packet signals of the speed similar to the primary circuit speed of such a circuit multiplexer are statistically multiplexed, the signal processes substantially similar to that in the secondary circuit of the circuit multiplexer are requested. To cope with such signals of a large capacity, the fairly higher signal processing speed than that in the conventional packet multiplexer is requested. Such a method of statistically multiplexing by the packet multiplexer is generally not practical from a view point of the multiplexing costs.

SUMMARY OF THE INVENTION

It is an object of the present invention to provide the statistical multiplexing to the circuits of a large capacity by the signal processing capability at a speed which is substantially equal to the packet signal speed.

To solve the above objects, according to the present invention, the packet signals from terminal equipment are distributed to a plurality of primary circuits, and the primary circuits are multiplexed to secondary circuit and are transmitted. For demultiplexing, the packet signals which were distributed and transmitted to a plurality of primary circuits are concentrated in correspondence to a source and are transmitted to a switching system.

According to the above configuration, since the packet signals from the terminal equipment can exist at all of the timing positions in the secondary circuit without being limited into a single primary circuit, this results in that the packet signals were statistically effectively multiplexed into the secondary circuit. On the other hand, each of the means for distributing the packet signals into a plurality of primary circuits and the means for concentrating the packet signals from a plurality of primary circuits in correspondence to the source merely needs the same signal processing speed as the primary circuit speed. The signal processes of the speed similar to the speed of the secondary circuit of a large capacity are unnecessary. That is, the statistical multiplexing to the circuits of a large capacity can be realized by the signal processing capability of the speed similar to the packet signal speed.

DESCRIPTION OF THE PREFERRED EMBODIMENTS

Figure 1:
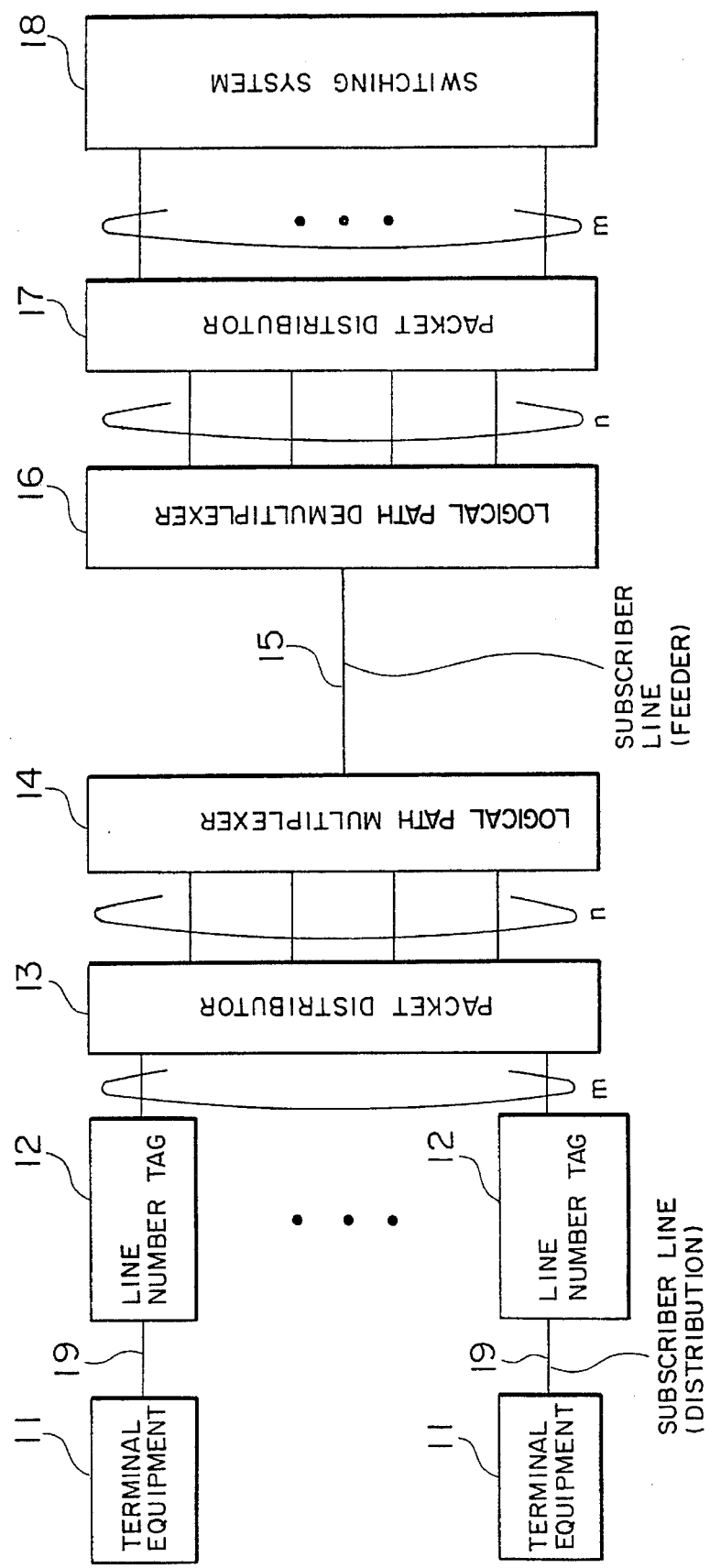
FIG. 1 is a diagram showing a fundamental construction of an embodiment of the present invention.

FIG. 1 shows an embodiment of the present invention. Subscriber line numbers which were fixedly assigned to subscriber distribution lines 19 corresponding to terminal equipment 11 are written to be incorporated into packet signals from the terminal equipment 11 by a subscriber line number tag section 12. The subscriber line numbers can be also assigned to special areas of packet headers or can be also realized as source addresses by decorating on the basis of a predetermined rule. A packet distributor 13 distributes the packet signals which were input from the m subscriber line number tag sections corresponding to the terminal equipment to n circuits forming logical transmission. A logical path multiplexer 14 multiplexes n primary circuits and sends the resulting signal to a physical transmission line 15.

A logical path demultiplexer 16 installed in an exchange demultiplexes the signals from the physical transmission to n primary circuits and to form m primary logical transmission paths. A packet distributor 17 concentrates the packet signals having the same subscriber line number in accordance with the subscriber line numbers from the n primary circuits or m primary logical transmission paths and sends it to m inputs of a switching system 18, respectively.

Figure 2:
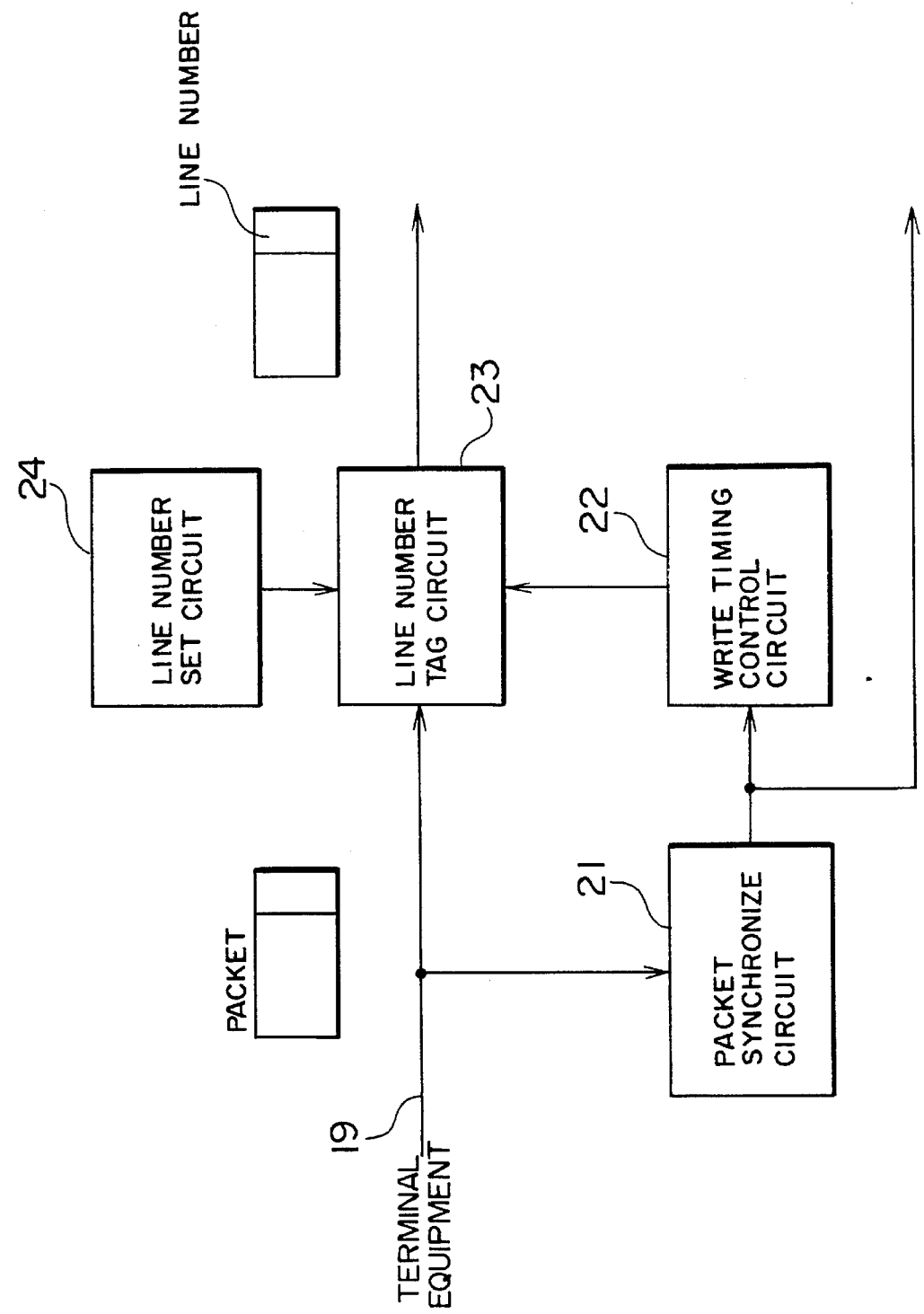
FIGS. 2 to 6, 10, and 11 are diagrams showing the details of each functional block in FIG. 1, respectively.

FIG. 2 shows the details of the subscriber line number tag section 12. The packet signals which were input from the terminal equipment 11 through the subscriber distribution lines 19 are supplied to a packet synchronize circuit 21, by which separating timings of packets are detected. In a write timing control circuit 22, the subscriber line number writing positions of packet header portions are indicated to a subscriber line number tag circuit 23 from the packet separating timings. At the designated timings, the subscriber line number tag circuit 23 writes the information which was set by a subscriber line number set circuit 24 into the header portions of the packet signals.

Figure 3:
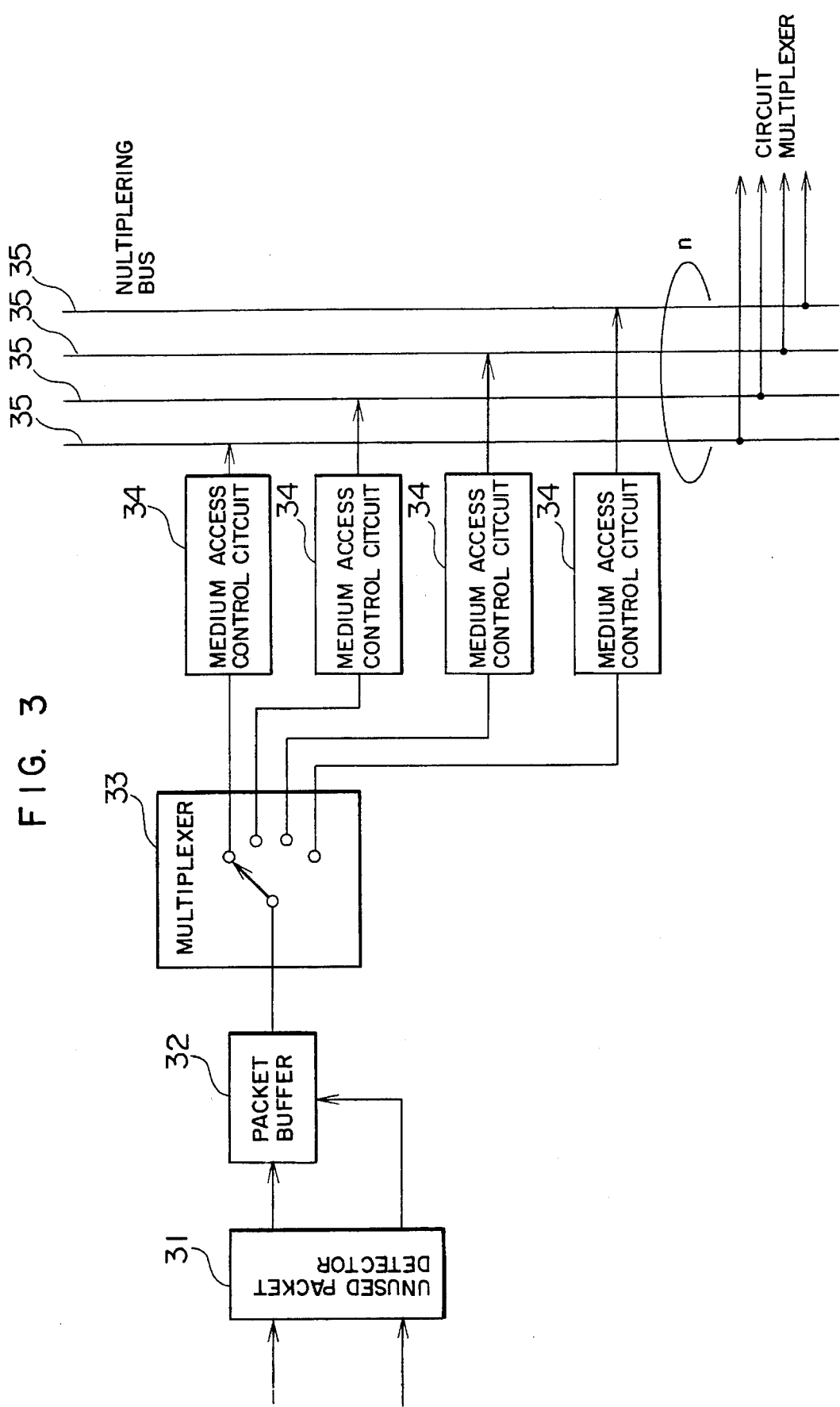

FIG. 3 is a diagram explaining the details of the packet distributor 13. In FIG. 3, as portions corresponding to reference numerals 31 to 34, m portions are necessarily in correspondence to the subscriber line number tag portions. However, all of the m portions are not shown but only one of them is shown. An unused packet detector 31 detects the packet signals which are not used among the packet signals from the subscriber line number tag portions 12 and controls buffer 32 so as not to write them into buffer 32. If predetermined packet signals were written into the buffer, a multiplexer 33 sequentially transmits the predetermined packet signals into a medium access control circuit 34. The multiplexer sequentially cyclically transmits the packet signals in accordance with the arrival order in correspondence to the n primary circuits to form m logical transmission paths. The medium access control circuit 34 is connected to a multiplexing buses 35 corresponding to the primary circuits. The medium access control circuits corresponding to all of the terminal equipment are connected to the multiplexing buses. The packet signals are transmitted while confirming that the other terminal equipment are not using any of the multiplexing buses. The multiplexing buses are connected as primary circuits to the logical path multiplexer 14, respectively.

Figure 4:
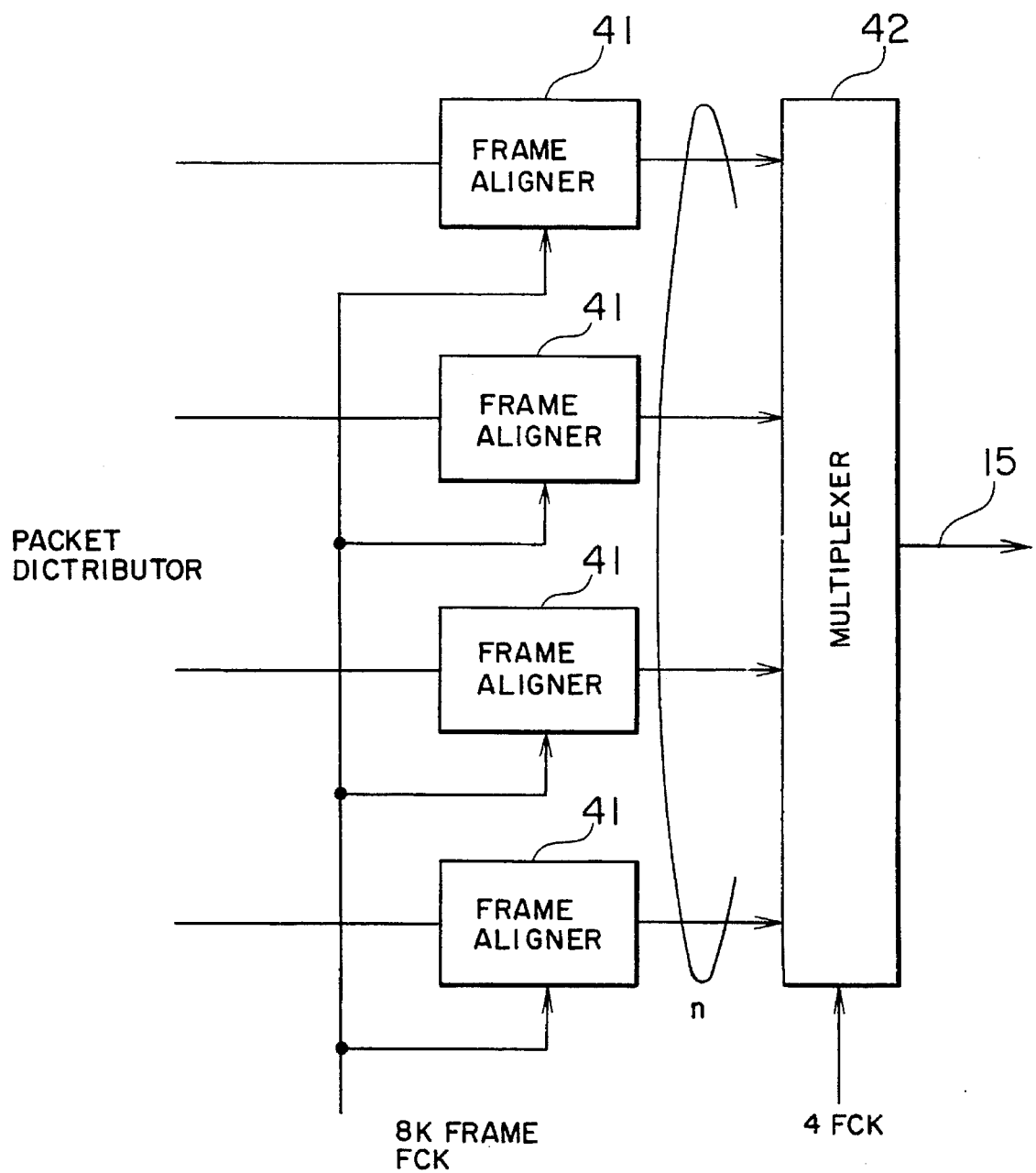

FIG. 4 is a diagram showing the circuit multiplexer. A frame aligner 41 constructs a transmission frame by clocks of 8 kHz which are supplied from the system and clocks corresponding to a circuit speed $F_{ck}$. A multiplexer 42 multiplexes n inputs at the speed which is n times as high as the circuit speed, thereby forming $n \times F_{ck}$ circuit multiplexing signals. Then, the multiplexer 42 sends the circuit multiplexing signals to the secondary circuit represents the logical transmission paths, that is, the subscriber line 15.

Figure 5:
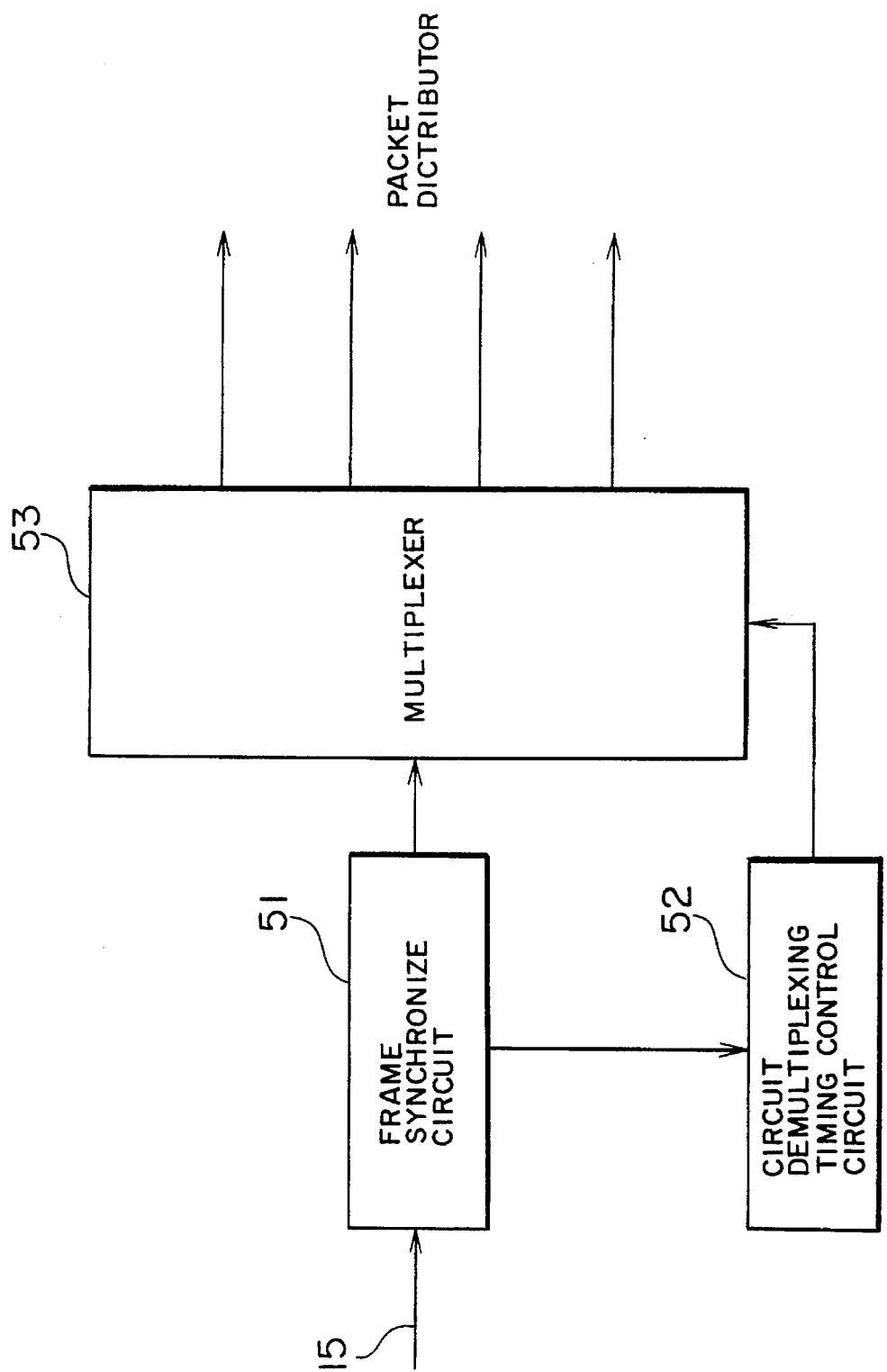

FIG. 5 shows a construction of the logical path demultiplexer 16. The circuit multiplexing signal which was input is supplied to a frame synchronize circuit 51, by which a frame synchronizing phase signal is detected. On the basis of the frame synchronizing phase signal, a signal to demultiplex individual primary circuits is formed by a circuit demultiplexing timing control circuit 52. A multiplexer 53 demultiplexes the individual primary circuits. The demultiplexed primary circuit signals are input to the packet distributor 17 through the multiplexing bus.

Figure 6:
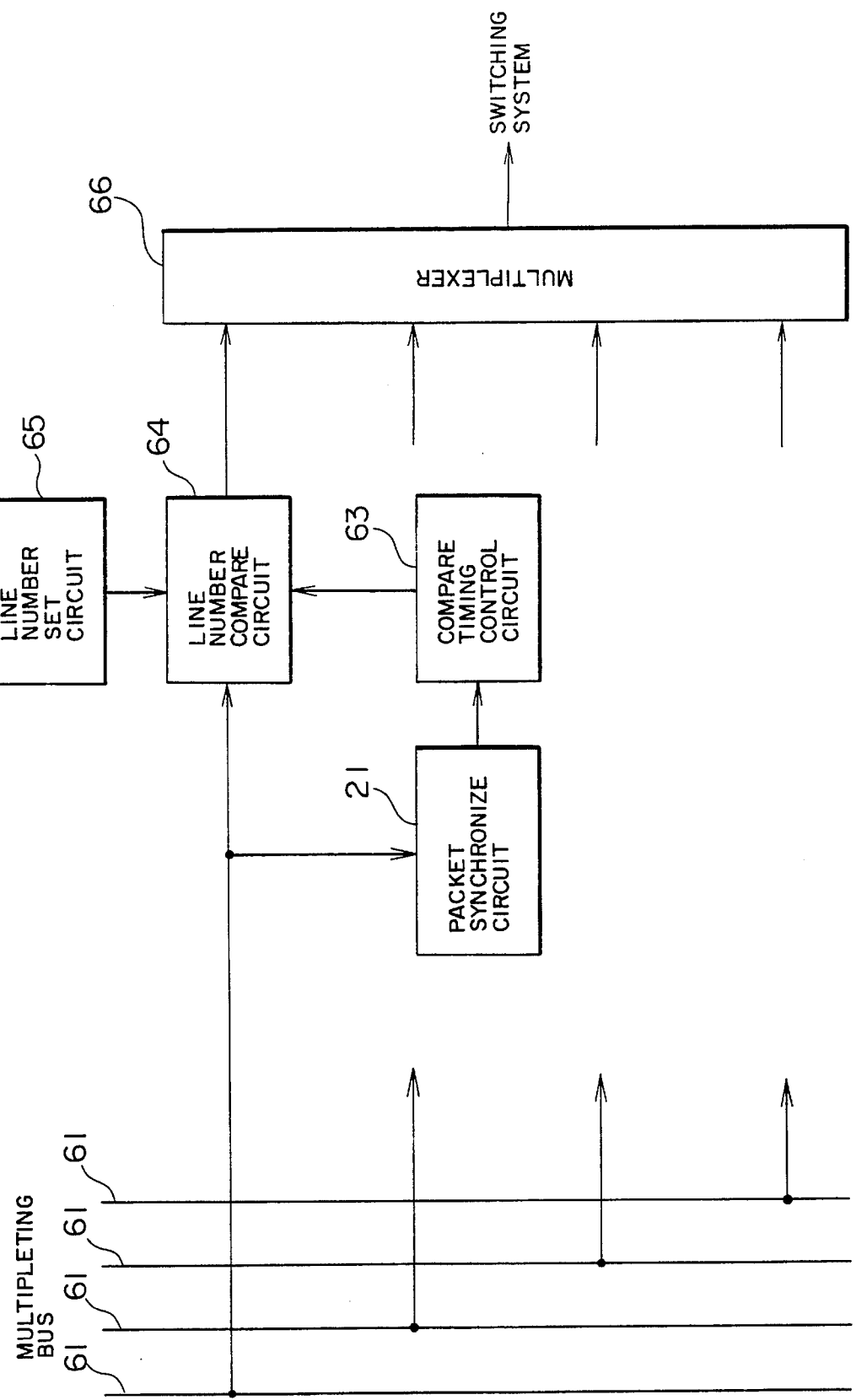

FIG. 6 shows a construction of the packet distributor 17. In the diagram, only one of the packet distributors 17 corresponding to four multiplexing buses is shown for simplicity. Timing information to demultiplex the packets by the packet synchronize circuit 21 is formed from the primary circuit signal which was input from the multiplexing bus 61. From the timing information, the timings to access to the subscriber line numbers in the packet headers are controlled by a compare timing control circuit 63. A subscriber line number compare circuit 64 compares the subscriber line numbers which were set by a subscriber line number set circuit 65 from the subscriber line numbers in the packet headers and sends the coincident subscriber line number to a multiplexer 66. The multiplexer 66 sequentially sends the signals which were input from the subscriber line number compare circuit 64 in correspondence to the circuits to the switching system 18.

The construction according to the embodiment has a feature such that for the switching system 18, the signals from the terminal equipment 11 are not so different from the signals in the case where the terminal equipment are directly enclosed in the switching system. There is an advantage such that the change of the switching system due to the execution of the statistical multiplexing is unnecessary.

Figure 7:
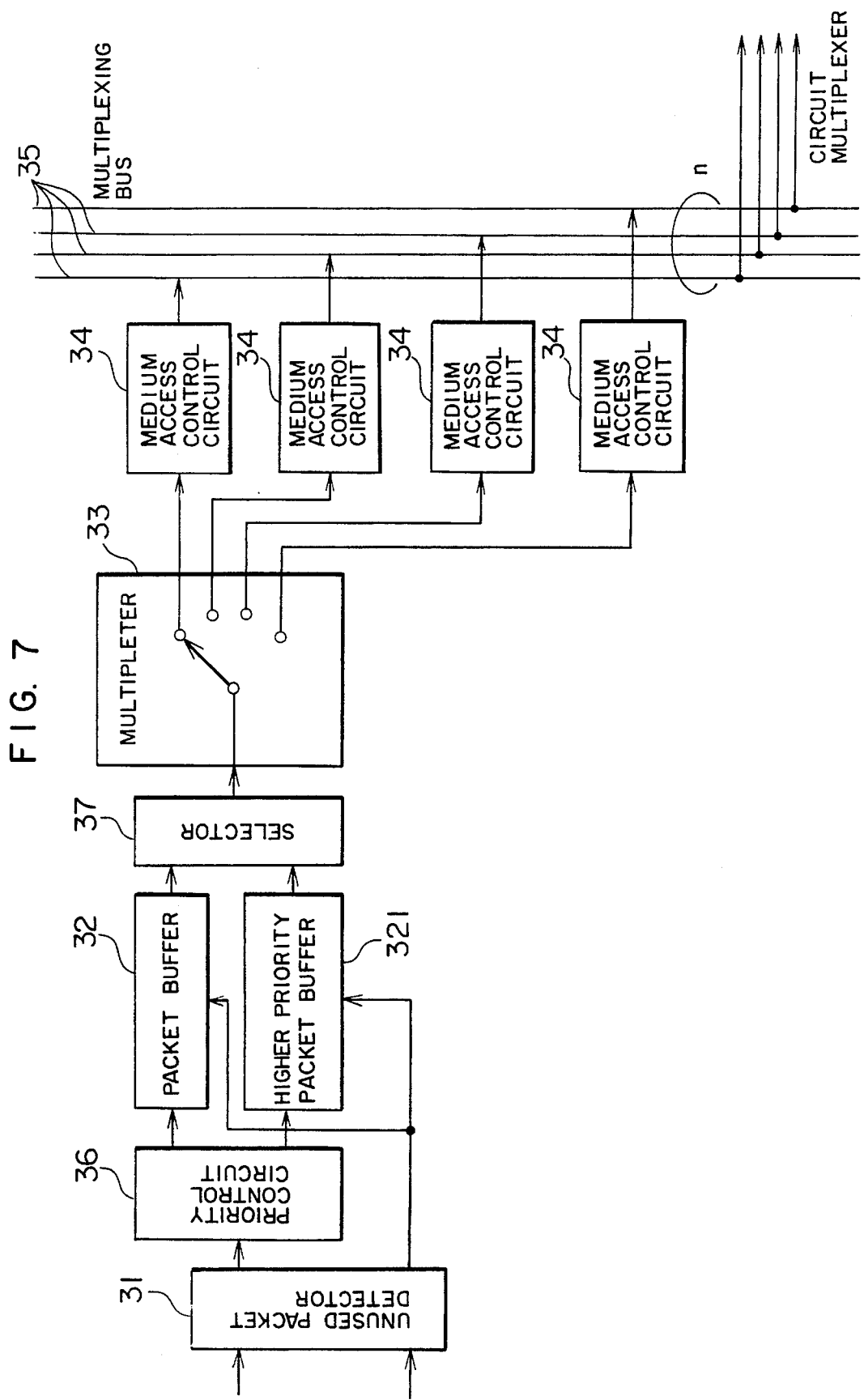
FIG. 7 is a diagram explaining another embodiment of the present invention.

FIG. 7 is a diagram showing another embodiment of the packet distributor 13. In the embodiment, the case where priorities are given to the packet transferring operations is shown. The packet having a higher priority is written into a higher priority packet buffer 321 by a priority control circuit 36 in accordance with the priority indication in the header. If a packet exists in the higher priority packet buffer, a priority packet selector 37 preferentially inputs this packet to the multiplexer 33. By using the priority information by the medium access control circuit 34, the priority control among different terminal equipment can be also executed. According to the embodiment, since the packet having a higher priority can be transferred earlier than the other packets, there is an advantage such that the real-time information such as audio information or the like can be assembled for packets and can be transferred.

Figure 8:
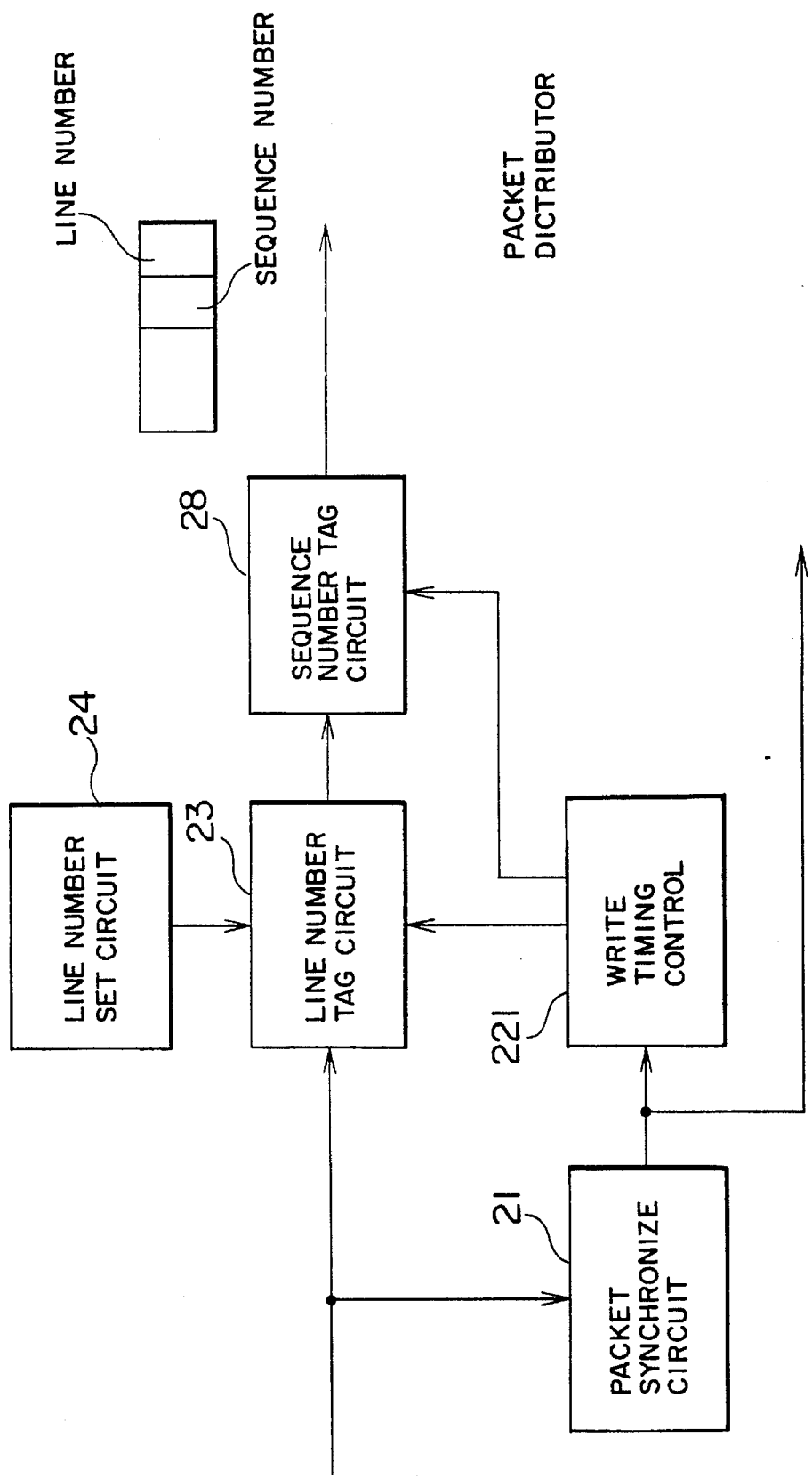
FIGS. 8 and 9 are diagrams showing further other embodiments of the invention.
Figure 9:
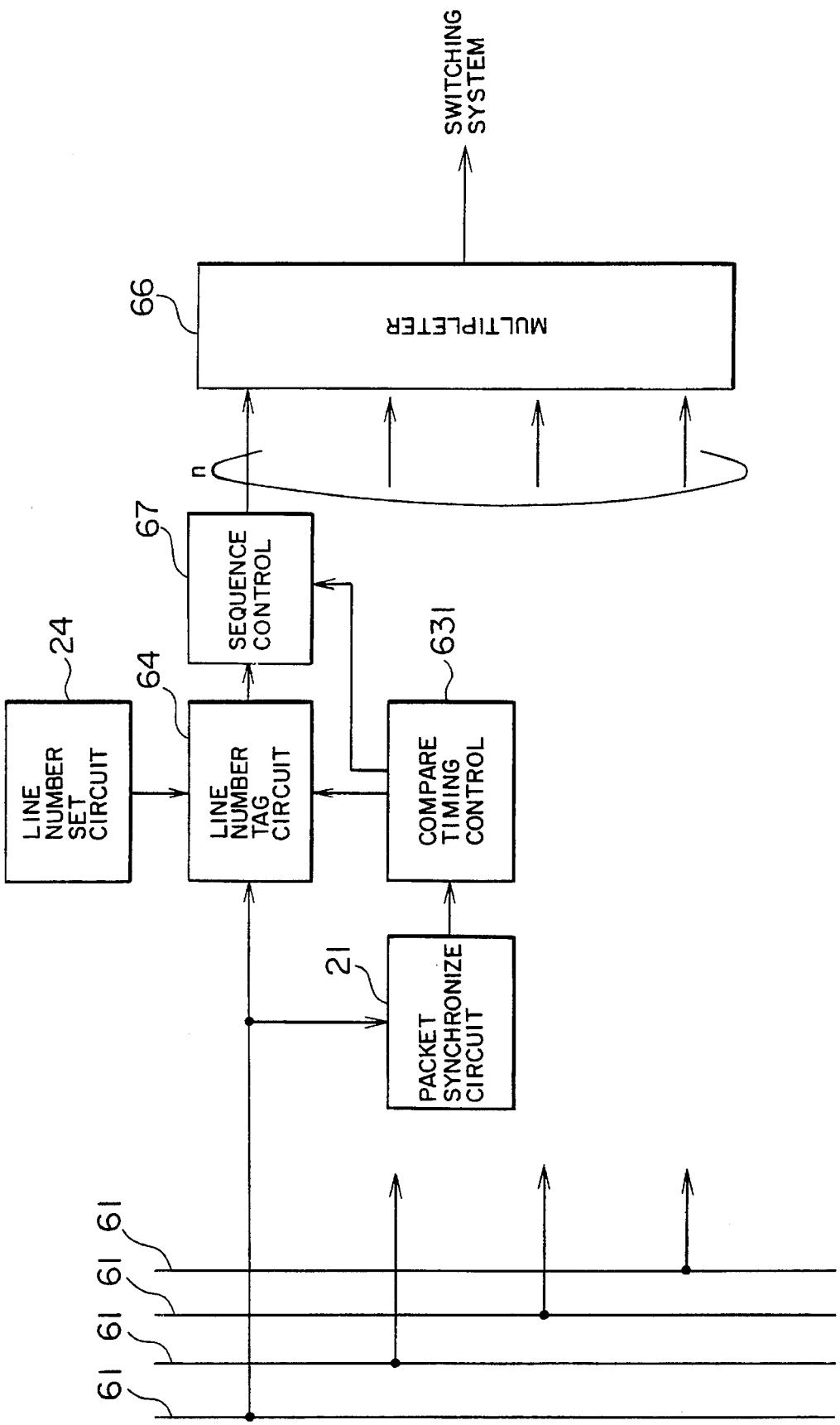

FIG. 8 is a diagram showing another embodiment of the invention. In the embodiment, the packet sequence numbers are written into the packet headers by the subscriber line number tag sections 12. A write timing control circuit 221 gives a write timing to a sequence number tag circuit 28. The sequence number tag circuit 28 writes the sequence numbers into the headers in accordance with a predetermined order. The packets to which the sequence numbers were written are supplied to a sequence control circuit 67 in the packet distributor 17 as illustrated in FIG. 9, and the sequence numbers are checked. If necessary the exchange of the packets occurs, and the packets are rearranged in the correct sequence. According to the embodiment, there are advantages such that not only the real-time information in which the transferring sequence of the packets is important can be correctly transferred but also in the case where the packets were abandoned during the statistical multiplexing process, the packets can be detected.

Figure 10:
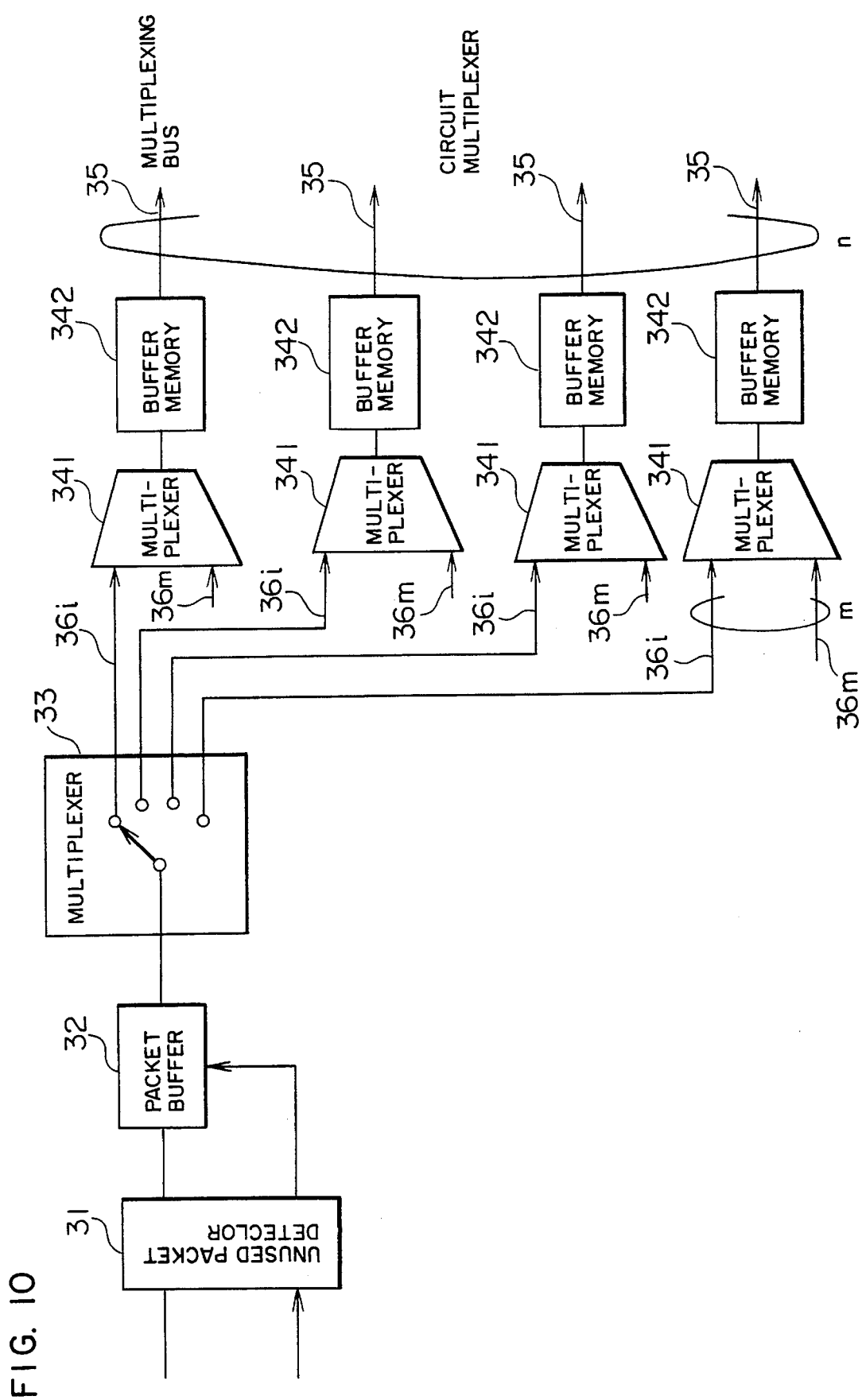

FIG. 10 illustrates another embodiment of the packet distributor 13 of the present invention. In the embodiment, outputs of the multiplexer 33 are multiplexed with outputs of (m - 1) multiplexers (not shown) 33 corresponding to the other subscriber lines 19 by another multiplexer 341 and are written into one of n buffer memories 342. The written packets are sequentially read out and sent to the circuit multiplexer. The embodiment has a feature such that the buffer memories can be effectively used because the buffer memories are concentratedly provided.

Figure 11:
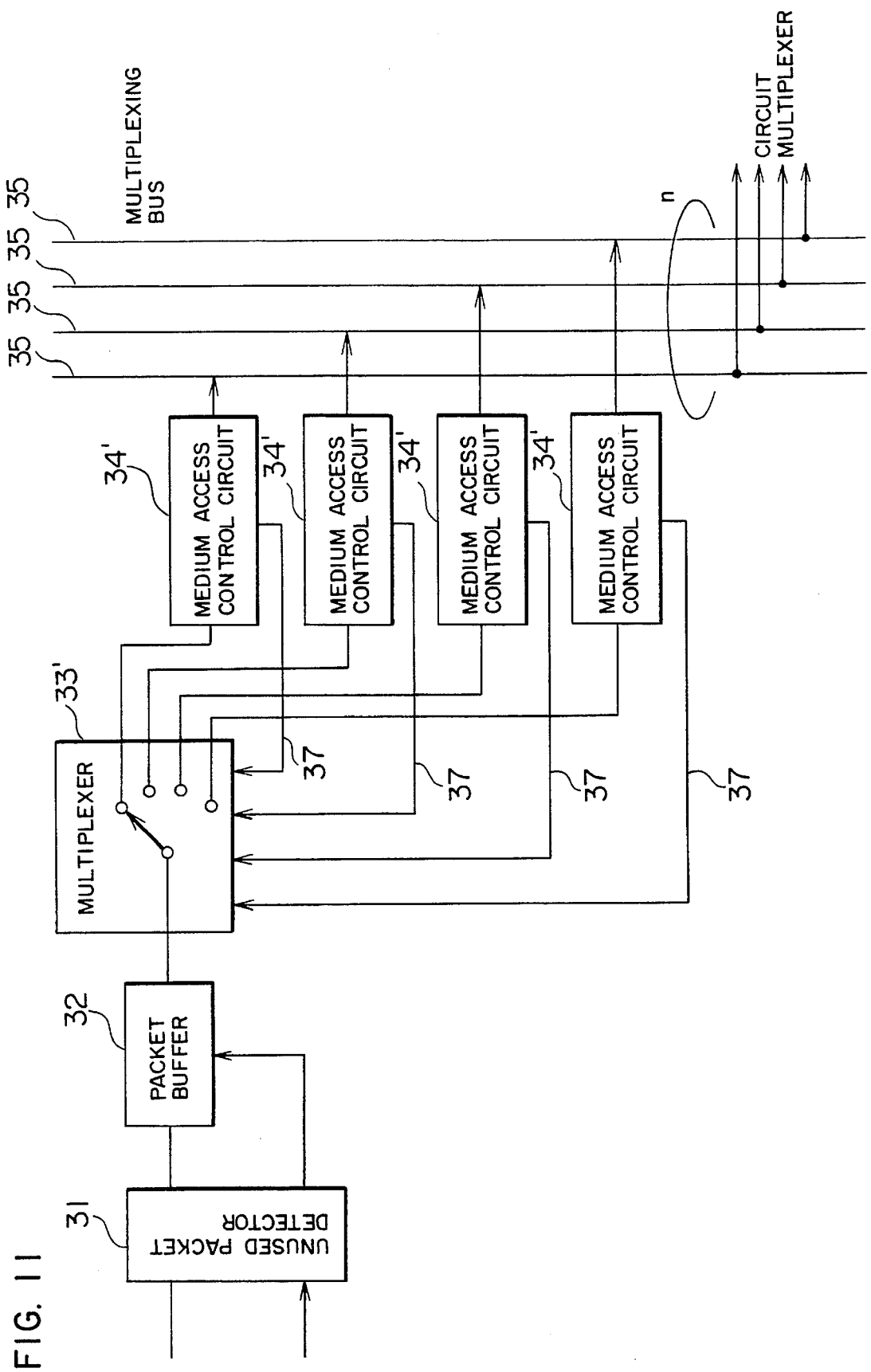

FIG. 11 is a diagram showing another embodiment of the packet distributor of the invention. In the embodiment, in order to guarantee the transmitting sequence of the packets, each medium access control circuit 34' which is provided with a feedback 37 from the medium access control circuit 34' to a multiplexer 33' accesses the multiplexing bus 35 and sends the packet and, thereafter, the completion of such processes is notified to the multiplexer 33' by the feedback 37. In response to such a notification, the multiplexer 33' switches the destination of the output. According to the embodiment, so long as the packet which has first arrived is not sent, the next packet is not sent, so that there is an advantage such that the packet sequence is correctly held.

As described above with respect to the embodiments, according to the method of the invention, the packet signals of a speed which is almost equal to the primary circuit speed are distributed to a plurality of primary circuits and are transmitted, so that there is an advantage such that the secondary circuit of a large capacity can be effectively used.

We claim:

1. A digital signal multiplexing method of statistically multiplexing plural packet signals from a plurality of terminals, said plural packet signals were transferred through plural first transmission lines having a first speed to a second transmission line having a second speed, the second speed being higher than said first speed, comprising the steps of:

dividing a signal into said plural packet signals to be transmitted on said second transmission line through a plurality of logical transmission paths;

distributing the plural packet signals from the plurality of terminals to said plurality of logical transmission paths and transmitting the plural packet signals through said plurality of logical transmission paths on a packet unit basis;

distributing the plural packet signals which were statistically multiplexed to said second transmission line onto a plurality of receiving logical transmission paths corresponding to said plurality of logical transmission paths; and generating received plural packet signals from said plurality of receiving logical transmission paths corresponding to said plural first transmission lines.

2. A method according to claim 1, wherein the step of generating received plural packet signals from said plurality of receiving logical transmission paths corresponding to said plural first transmission lines comprises the steps of:

detecting circuit numbers corresponding to the plural first transmission lines and said plural packet signals; and adding said circuit numbers to said received plural packets signals.

3. A digital signal multiplexing method of statistically multiplexing plural packet signals from a plurality of terminals, said plural packet signals were transferred through plural first transmission lines having a first speed to a second transmission line having a second speed, the second speed being higher than said first speed, comprising the steps of:

dividing a signal into said plural packet signals to be transmitted on said second transmission line through a plurality of logical transmission paths; and distributing the plural packet signals from the plurality of terminals to said plurality of logical transmission paths and transmitting the plural packet signals through said plurality of logical transmission paths on a packet unit basis;

wherein the step of distributing the plural packets signals to said plurality of logical transmission paths and transmitting the plural packet signals through the plurality of logical paths on a packet basis includes a step of cyclically switching the plural packet signals onto said plurality of logical transmission paths, the plural packet signals being sequentially transmitted in accordance with the sequence of the plural packet signals received from the plural first transmission lines.

4. A digital signal multiplexing method of statistically multiplexing plural packet signals from a plurality of terminals, said plural packet signals were transferred through plural first transmission lines having a first speed to a second transmission line having a second speed, the second speed being higher than said first speed, comprising the steps of:

dividing a signal into said plural packet signals to be transmitted on said second transmission line through a plurality of logical transmission paths; and distributing the plural packet signals from the plurality of terminals to said plurality of logical transmission paths and transmitting the plural packet signals through said plurality of logical transmission paths on a packet unit basis;

wherein the step of distributing the plural packet signals into said plurality of logical transmission paths and transmitting the plural packet signals through the plurality of logical paths on a packet basis, comprises the steps of:

detecting if one of the plural packet signals has been distributed to one of said logical transmission paths during the transmission of the plural packet signals and transmitting said one of said plural packet signals onto said plurality of logical transmission paths if said one of the plural packet signals has been detected.

5. A digital signal multiplexing method of statistically multiplexing plural packet signals from a plurality of terminals which were transferred through plural first transmission lines having a first speed to a second transmission line having a second speed, the second speed being higher than said first speed, comprising the steps of:

dividing a signal into said plural packet signals to be transmitted on said second transmission line through a plurality of logical transmission paths; and distributing the plural packet signals from the plurality of terminals to said plurality of logical transmission paths and transmitting the plural packet signals through said plurality of logical transmission paths on a packet unit basis;

wherein the step of distributing the plural packet signals to said plurality of logical transmission paths and transmitting the plural packet signals through the plurality of logical paths on a packet basis comprises the step of:

adding sequence numbers to said plural packet signals transmitted onto said plurality of logical transmission paths corresponding to the sequence of the plural packet signals which are received.

6. A digital signal multiplexer for statistically multiplexing plural packet signals from a plurality of terminals, said plural packet signals were transferred through plural first transmission lines having a first speed to a second transmission line having a second speed, said second speed being higher than said first speed, comprising:

means for dividing a signal into said plural packet signals to be transmitted on said second transmission line through a plurality of logical transmission paths;

means for distributing the plural packet signals from the plurality of terminals onto said plurality of logical transmission paths and transmitting the plural packet signals through said plurality of logical transmission paths on a packet unit basis;

means for distributing the plural packet signals which were statistically multiplexed to the second transmission line onto a plurality of receiving logical transmission paths corresponding to said plurality of logical transmission paths; and means for generating received plural packet signals from said plurality of receiving logical transmission paths corresponding to the plural first transmission lines.

7. A digital signal multiplexer according to claim 6, wherein said means for generating the received plural packet signals of said plurality of receiving logical transmission paths and corresponding to the plural first circuits comprises:

means for detecting circuit numbers corresponding to the plural first transmission lines and the plural packet signals; and means for adding the circuit numbers to the received plural packet signals.

8. A digital signal multiplexer according to claim 6, wherein the digital signal multiplexer further comprises means for adding a sequence number to said plural packet signals as the plural packet signals are distributed into said plurality of logical transmission paths and transmitted, said sequence number corresponding to the sequence of plural packet signals received from the plural first transmission lines.

9. A digital signal multiplexer as in claim 8, wherein said adding means includes means for checking the sequence number and rearranging the sequence in accordance with a correct sequence corresponding to the order of plural packet signals received.

10. A digital signal multiplexer for statistically multiplexing plural packet signals from a plurality of terminals, said plural packet signals were transferred through plural first transmission lines having a first speed to a second transmission line having a second speed, said second speed being higher than said first speed, comprising:

means for dividing a signal into said plural packet signals to be transmitted on said second transmission line through a plurality of logical transmission paths; and means for distributing said plural packet signals from said plurality of terminals onto said plurality of logical transmission paths and transmitting said plural packet signals through said plurality of logical transmission paths on a packet unit basis;

wherein said means for distributing said plural packet signals into said plurality of logical transmission paths and transmitting said plural packet signals through said plurality of logical transmission paths includes means for cyclically switching said plural packet signals onto said plurality of logical transmission paths, said plural packet signals being sequentially transmitted in accordance with a sequence of said plural packet signals received from said plural first transmission lines.

11. A digital signal multiplexer as in claim 10, wherein said cyclically switching means includes first switching means for obtaining a first packet signal transmitted on a first logical transmission path of said plurality of logical transmission paths, second switching means for obtaining a second packet signal transmitted on a second logical transmission path of said plurality of logical transmission paths and means for multiplexing said first packet signal with said second packet signal.

12. A multiplexer as in claim 10, wherein said cyclically switching means includes a multiplexer and a medium access control circuit, said multiplexer receiving feedback from said medium access control circuit.

13. A digital signal multiplexer for statistically multiplexing plural packet signals from a plurality of terminals which were transferred through plural first transmission lines having a first speed to a second transmission line having a second speed, said second speed being higher than said first speed, comprising:

means for dividing a signal into said plural packet signals to be transmitted on said second transmission line through said plurality of logical transmission paths;

means for distributing the plural packet signals from the plurality of terminals onto said plurality of logical transmission paths and transmitting the plural packet signals through said plurality of logical transmission paths on a packet unit basis; and means for detecting if one of said plural packet signals has been distributed to one of the plurality of logical transmission paths during the transmission of the plural packet signals and means for transmitting said one of said plural packet signals onto said plurality of logical transmission paths if the one of the plural packet signals had been detected.

14. A multiplexer for statistically multiplexing plural packet signals from a plurality of terminals, said plural packet signals were transferred through plural first transmission lines having a first speed to a second transmission line having a second speed, said second speed being higher than said first speed, comprising:

means for dividing a signal into said plural packet signals to be transmitted on said second transmission line through a plurality of logical transmission paths; and means for distributing said plural packet signals from said plurality of terminals onto said plurality of logical transmission paths and transmitting said plural packet signals through said plurality of logical transmission paths on a packet unit basis;

wherein said distributing means includes means for assigning a priority to each of said plural packet signals and means for transmitting said plural packet signals corresponding to said priority.

15. A packet signal transmission method for transmitting a plurality of packets inputted to a multiplexing apparatus through a plurality of first transmission lines to a demultiplexing apparatus through a second transmission line, each of said first transmission lines having a first signal transmission rate and said second transmission line having a second signal transmission rate which is higher than said first signal transmission rate, the transmission method comprising the steps of:

distributing, in said multiplexing apparatus, input packets successively received from each of said first transmission lines to a plurality of first intermediate lines in a predetermined order, respectively, so that each of said first intermediate lines carries a packet stream which includes input packets sent out from different source terminals; and multiplexing, in said multiplexing apparatus, a plurality of packet streams received from said first intermediate lines to said second transmission line in a circuit multiplexing manner so that input packets in one of said packet streams received from one of said first intermediate lines are carried by a predetermined time slot on the second transmission line and said input packets sent out from a same source terminal are transmitted to said demultiplexing apparatus by distributing said input packets sent out from the same source terminal into a plurality of time slots assigned to different first intermediate lines.

16. A packet signal transmission method according to claim 15, further comprising the steps of:

demultiplexing, in said demultiplexing apparatus the contents of time slots on said second transmission line to a plurality of second intermediate lines prepared corresponding to said time slots on the second transmission line, respectively; and distributing packet streams received from said second intermediate lines to a plurality of output lines corresponding to said first transmission lines so that a group of packets sent out from the same source terminal are selectively delivered to one of said output lines from said plural packet streams received from said second intermediate lines.

17. A packet signal transmission method according to claim 16, wherein said step of distributing packets streams to said output lines in said demultiplexing apparatus is carried out in accordance with routing information included in a header portion of each of said received packets.

18. A packet signal transmission method according to claim 15, wherein said distributing step of input packets to said first intermediate lines in said multiplexing apparatus is carried out for each of said first transmission lines by cyclically switching one of said first intermediate lines, to which an input packet is distributed, every time an input packet is received from a first transmission line.

19. A packet signal transmission method according to claim 18, wherein said distributing step of input packet to said first intermediate lines in said multiplexing apparatus is carried out by determining whether or not said one of said first intermediate lines to be distributed an input packet thereto is used to distribute the other one of packets received from the other one of said first transmission lines and by waiting until a first intermediate line becomes free if the line was busy.

20. A packet signal transmission method for transmitting a plurality of packets each having routing information and inputted to a multiplexing apparatus through a plurality of first transmission lines to a demultiplexing apparatus through a second transmission line, each of said first transmission lines having a first signal transmission rate and said second transmission line having a second signal transmission rate which is higher than said first signal transmission rate, the transmission method comprising the steps of:

adding in each of said first transmission lines, a sequence number to each of input packets successively transmitted to each of said first transmission lines;

distributing, in said multiplexing apparatus, said input packets with the sequence numbers successively received from each of said first transmission lines to a plurality of first intermediate lines in a predetermined order, respectively, so that each of said first intermediate lines carries a packet stream which includes input packets sent out from different source terminals;

multiplexing, in said multiplexing apparatus, a plurality of packet streams received from said first intermediate lines to said second transmission line in a circuit multiplexing manner so that each of said packet streams received from said first intermediate lines is carried by a predetermined time slot on the second transmission line and input packets sent out from a same source terminal are transmitted to said demultiplexing apparatus by distributing said input packets sent out from the same source terminal into a plurality of time slots assigned to different first intermediate lines;

demultiplexing, in said demultiplexing apparatus, a packet stream received from said second transmission line to a plurality of second intermediate lines corresponding to different time slot on the second transmission line, respectively; and distributing packet streams received from said second intermediate lines to a plurality of output lines prepared corresponding to said first transmission lines, in accordance with the routing information and sequence number included in each of said received packets to that a group of packets sent out from the same source terminal are selectively delivered to one of said output lines in a predetermined order from said plural packet streams received from said second intermediate lines.

21. A packet signal transmission system having a multiplexing apparatus for transmitting a plurality of packets inputted from a plurality of first transmission lines to a second transmission line by statistically multiplexing said input packets, each of said first transmission lines having a first signal transmission rate and said second transmission line having a second signal transmission rate at which is higher than said first signal transmission rate, characterized in that said multiplexing apparatus comprising:

first means connected to said first transmission lines for distributing input packets successively received from each of said first transmission lines to a plurality of first intermediate lines in predetermined order, respectively, so that each of said first intermediate lines carries a packet stream which includes input packets sent out from different source terminals; and second means for multiplexing a plurality of packet streams received from said first intermediate lines to said second transmission line in a circuit multiplexing manner so that each of said packet streams received from said first intermediate lines is carried by a predetermined time slot on the second transmission line input packets sent out from a same source terminal are transmitted on said second transmission line by distributing said input packets sent out from the same source terminal into a plurality of time slots assigned to different first intermediate lines.

22. A packet signal transmission system according to claim 21, further including a demultiplexing apparatus connected to said second transmission line, said demultiplexing apparatus comprising:

third means connected to said second transmission line for demultiplexing the contents of time slots on the second transmission line to a plurality of second intermediate lines prepared in corresponding to said respective time slots on the second transmission line; and fourth means connected to said second intermediate lines for distributing packet streams received from said second intermediate lines to a plurality of output lines prepared in corresponding to said first transmission lines, whereby a group of packets sent out from the same source terminal are selectively delivered to one of said output lines from said plural packet streams received from said second intermediate lines.

23. A packet signal transmission system according to claim 22, wherein said fourth means comprises means for distributing said packets streams to said output lines in accordance with routing information included in a header portion of each of said received packets.

24. A packet signal transmission system according to claim 21, wherein said first means comprising means for distributing said input packets to said first intermediate lines for each of said first transmission lines by cyclically switching one of said first intermediate lines, to which the input packet is distributed, every time an input packet is received from a first transmission line.

25. A packet signal transmission system according to claim 24, wherein said first means comprises means for distributing said input packets to said first intermediate lines by determining whether or not said one of said first intermediate lines to be distributed an input packet thereto is used to distribute the other one of packets received from the other one of said first transmission lines and for waiting until the first intermediate line becomes free if the first intermediate line was busy.

26. A packet signal transmission system comprising:

a plurality of first transmission lines each for transmitting packets send out from a terminal and having a first signal transmission rate;

a second transmission line having a signal transmission rate higher than said first signal transmission rate;

a multiplexing apparatus connected between said first transmission lines and said second transmission line;

means for adding in each of said first transmission lines, a sequence number to each of input packets successively transmitted by each of said first transmission lines; and a demultiplexing apparatus connected to said second transmission line;

wherein said multiplexing apparatus includes:

first means connected to said first transmission lines for distributing input packets successively received from each of said first transmission lines to a plurality of first intermediate lines in a predetermined order, respectively, so that each of said first intermediate lines carries a packet stream which includes input packets sent out from different source terminals; and second means for multiplexing a plurality of packet streams received from said first intermediate lines to said second transmission line in a circuit multiplexing manner so that each of said packet streams received from said first intermediate lines is carried by a predetermined time slot on the second transmission line, thereby to transmit by said second transmission line input packets sent out from a same source terminal by distributing into a plurality of time slots assigned to different first intermediate lines;

and wherein said demultiplexing apparatus includes:

third means connected to said second transmission line for demultiplexing the contents of time slots on the second transmission line to a plurality of second intermediate lines prepared in corresponding to said respective time slots on the second transmission line; and fourth means connected to said second intermediate lines for distributing packet streams received from said second intermediate lines to a plurality of output lines prepared in corresponding to said first transmission lines, according to the routing information and sequence number included in each of said received packets, whereby a group of packets sent out from a same source terminal are selectively delivered on a predetermined order to one of said output lines delivered on a predetermined order to one of said output lines from said plural packet streams received from said second intermediate lines.

27. A packet signal multiplexing system for transmitting a plurality of packets inputted from a plurality of terminals through a plurality of first transmission lines to a second transmission line by statistically multiplexing said input packets, each of said first transmission lines having a first signal transmission rate and said second transmission line having a second signal transmission rate which is higher than said first signal transmission rate, comprising:

means connected between said first transmission lines and a plurality of intermediate lines for distributing input packets successively received from each of said first transmission lines to said intermediate lines in a predetermined order, respectively, so that each of said intermediate lines carries a packet stream which includes input packets sent out from different source terminals; and means connected between said intermediate lines and said second transmission line for multiplexing a plurality of packet streams received from said intermediate lines to said second transmission lines in a circuit multiplexing manner so that each of said packet streams received from said intermediate lines is carried by a predetermined time slot on the second transmission line, thereby to transmit by said second transmission line input packets sent out from a same source terminal by statistically distributing into a plurality of time slots assigned to different intermediate lines.

* * * * *